(12) United States Patent
Kruszynski et al.

(10) Patent No.: US 7,695,221 B2
(45) Date of Patent: Apr. 13, 2010

(54) SOLID DRILL BIT FOR MACHINE TOOLS

(75) Inventors: Jacek Kruszynski, Stuttgart (DE); Alexander Krause, Brackenheim (DE); Henry Schütt, Sachsenheim (DE)

(73) Assignee: Komet Group GmbH, Besigheim (DE)

( * ) Notice: Subject to any disclaimer, the term of this patent is extended or adjusted under 35 U.S.C. 154(b) by 0 days.

(21) Appl. No.: 12/012,097

(22) Filed: Jan. 31, 2008

(65) Prior Publication Data

US 2008/0131217 A1 Jun. 5, 2008

Related U.S. Application Data

(62) Division of application No. 10/522,647, filed on Jan. 26, 2005, now Pat. No. 7,351,017.

(51) Int. Cl.
*B26D 1/00* (2006.01)
*B23B 51/00* (2006.01)

(52) U.S. Cl. ...................... 407/113; 408/713

(58) Field of Classification Search ......... 407/113–116; 408/223, 186.713
See application file for complete search history.

(56) References Cited

U.S. PATENT DOCUMENTS

| 3,963,365 | A | | 6/1976 | Shallenberger, Jr. | |
|---|---|---|---|---|---|
| 4,124,328 | A | * | 11/1978 | Hopkins | ...................... 408/223 |
| 4,131,383 | A | | 12/1978 | Powers | |
| 4,265,574 | A | | 5/1981 | Eckle | |
| 4,367,991 | A | | 1/1983 | Gräfe et al. | |
| 4,558,975 | A | * | 12/1985 | Hale | ............ 408/186 |
| 4,563,113 | A | | 1/1986 | Ebenhoch | |
| 4,889,455 | A | | 12/1989 | Karlsson et al. | |
| 5,049,011 | A | | 9/1991 | Bohnet et al. | |
| 5,302,059 | A | | 4/1994 | Fabiano | |
| 5,509,761 | A | | 4/1996 | Grossman et al. | |
| 5,788,431 | A | | 8/1998 | Basteck | |
| 5,800,100 | A | * | 9/1998 | Krenzer | ...................... 408/224 |
| 5,848,861 | A | | 12/1998 | Hansen | |
| 5,947,650 | A | | 9/1999 | Satran et al. | |
| 6,039,515 | A | | 3/2000 | Lamberg | |
| 6,135,681 | A | * | 10/2000 | Nuzzi et al. | ................. 408/227 |
| 6,224,300 | B1 | | 5/2001 | Baxivanelis et al. | |

FOREIGN PATENT DOCUMENTS

| DE | 201 18 111 U1 | 4/2002 |
|---|---|---|
| EP | 0 875 322 A1 | 11/1998 |
| WO | WO 01/85375 A1 | 11/2001 |

* cited by examiner

*Primary Examiner*—Will Fridie, Jr.
(74) *Attorney, Agent, or Firm*—Flynn, Thiel, Boutell & Tanis, P.C.

(57) ABSTRACT

A solid drill bit for machine tools has a drill bit body and two indexable inserts arranged at a radial distance from one another in respective insert seats. The inserts have an essentially quadratic contour. Their front-end main cutting edges project axially beyond the drill bit body and radially overlap one another. The outer insert has an outer insert corner and a secondary cutting edge perpendicular to the main cutting edge that projects radially beyond the circumference of the drill bit body. To permit burr-free through-drilling, the main cutting edge of the outer insert is subdivided in its longitudinal extent into a radially inner working section and a rectilinear peeling section adjoining the working section and extending to the outer insert corner. The sections enclose a setting angle of 95° to 120°. The peeling section is set at a positive setting angle of 72° to 87°.

12 Claims, 3 Drawing Sheets

Figure 1:
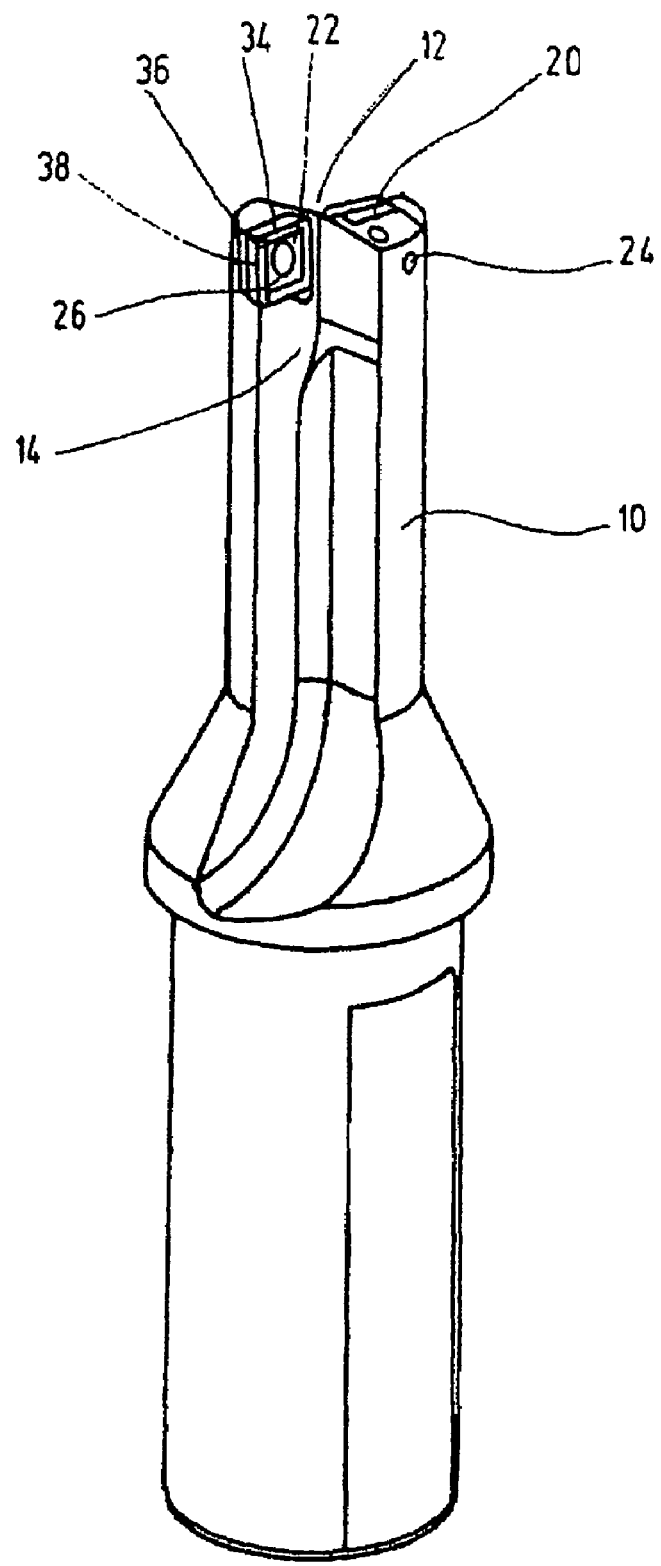

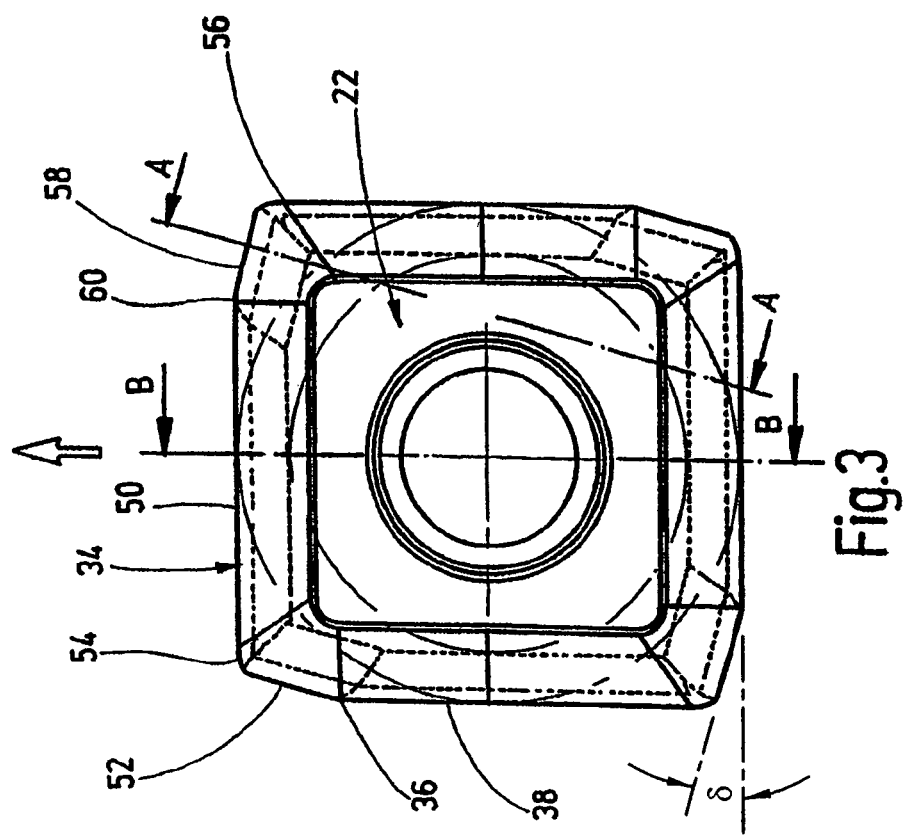
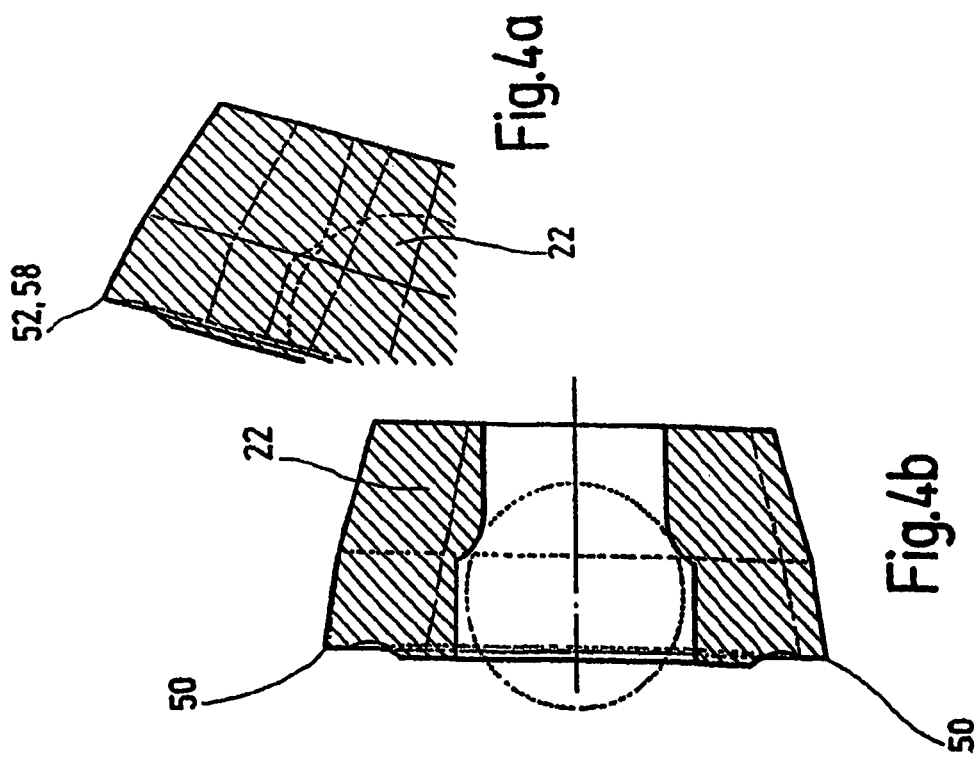

SOLID DRILL BIT FOR MACHINE TOOLS

This application is a divisional application of Ser. No. 10/522,647, filed Jan. 26, 2005, now U.S. Pat. No. 7,351,017 the disclosure of which is hereby incorporated by reference.

DESCRIPTION

The invention relates to a solid drill bit for machine tools, having a drill bit body and at least two inserts which are arranged at a radial distance from one another in a respective insert seat of the drill bit body in the region of a chip flute, project with their front-end main cutting edges axially beyond the drill bit body and radially overlap one another in their active regions, the radially outermost insert, with its outer insert corner, which forms a diameter, and its adjoining secondary cutting edge, projecting radially beyond the drill bit body, and the secondary cutting edge, starting from the insert corner, being inclined at a defined setting angle in its longitudinal extent in the direction of the drill bit body.

Drilling tools of this type having two essentially quadratic indexable inserts are known (WO01/85375). The two quadratic inserts are arranged at different radial distances from one another. With their front-end main cutting edges, they project with a positive rake angle axially beyond the drill bit body. The inner insert has a pre-cutting action in the axial direction, the distance corresponding approximately to the radius of curvature in the region of the insert corners. The inclination of the secondary cutting edge of the outermost insert, at less than 3.2°, is selected in such a way that the secondary cutting edge forms a guide edge which, during the drilling operation, under the effect of a drifting force pointing radially outward, bears in a sliding manner, at least over part of its length, against the wall of the hole produced beforehand. When drilling through workpieces of ductile material using such solid drill bits, it has been found that a projecting burr is formed from the hole in the radius region, this burr often having to be removed subsequently. Burrs also occur during the spot drilling with such a solid drill bit. Tests have shown that, even by using inserts having rounded-off insert corners, a burr formation cannot be avoided.

Based thereon, the object of the invention is to improve the known solid drill bit and its inserts to the effect that burr-free through-drilling is possible even in workpieces of ductile material.

To achieve this object, the feature combinations specified in patent claims 1 and 9 are proposed. Advantageous configurations and developments of the invention follow from the dependent claims.

The solution according to the invention is based on the idea of designing the main cutting edge in such a way that a burr forming in the diameter region of the hole can be cut in the manner of a peeling or reaming operation. In order to achieve this, it is proposed according to the invention that the front-end main cutting edge of the outer insert be subdivided in its longitudinal extent into a radially inner working section and a rectilinear peeling section adjoining said working section on the outside and extending up to the outer insert corner, said sections enclosing an angle of 95° to 120° with one another. The working section leads during the drilling operation, while the peeling section follows up in the diameter region with a steep peeling angle. As a result, the workpiece in the vicinity of the diameter region, depending on the steepness of the setting angle, is divided into more or less fine marginal chips, so that a burr formation is avoided.

A preferred configuration of the invention provides for the working section of the main cutting edge, toward the peeling section, to be set at a positive setting angle of 2° to 10° relative to the imaginary end face, perpendicular to the drill bit axis, of the drill bit body, whereas the peeling section of the main cutting edge, toward the outer insert corner, is set at a positive setting angle of 77° to 87° relative to the end face of the drill bit body. The transition point between working section and peeling section of the main cutting edge may be rounded off convexly. In contrast to that, the outer insert corner should be of relatively sharp-edged design. In the region of the outer insert corner, the peeling section of the main cutting edge and the adjacent secondary cutting edge enclose an angle of 160° to 175° with one another, the secondary cutting edge, in accordance with WO01/85375, being expediently inclined with a setting angle of less than 3.2° in the direction of the drill bit body.

A further advantageous configuration of the invention provides for a central section extending up to the inner insert corner to adjoin the preferably rectilinear working section of the front-end main cutting edge radially on the inside, this central section enclosing a sweepback angle of 160° to 175° with the working section and being set at a negative setting angle of 3° to 18° relative to the end face of the drill bit body. The active region of the central section of the front-end main cutting edge of the outer insert is expediently overlapped by the front-end main cutting edge of the inner insert. This is therefore important because the inserts are preferably designed as indexable inserts having four identical main cutting edges, the central section of a first main cutting edge, during an indexing operation, being turned into the peeling section of an adjacent main cutting edge. It is therefore important that the central section of the outer insert remains free of wear during the drilling operation.

Figure 2C:
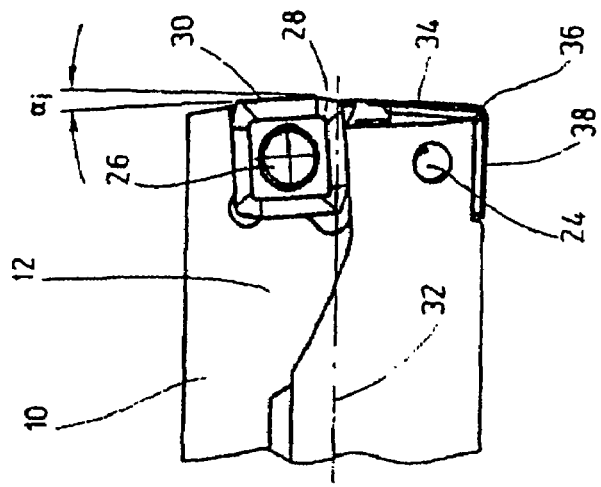
Figure 2A:
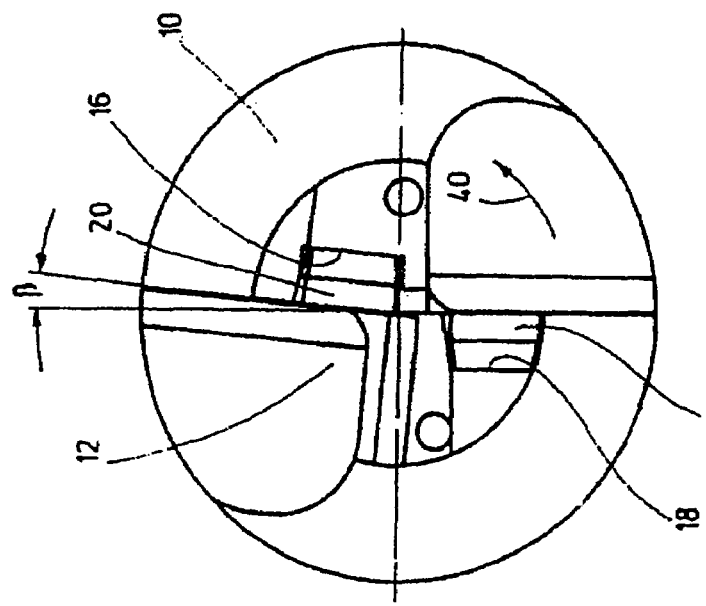
Figure 2B:
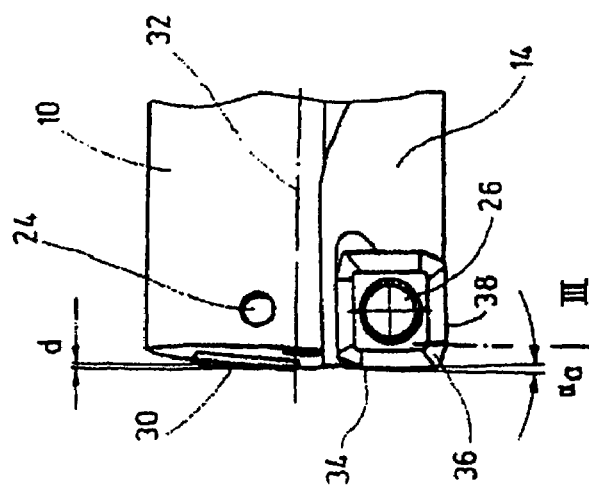

The invention is explained in more detail below with reference to an exemplary embodiment shown schematically in the drawing, in which:

FIG. 1 shows a solid drill bit for machine tools with essentially quadratic indexable inserts in a diagrammatic illustration;

FIGS. 2a to c show a plan view and two cut-away side views of the solid drill bit according to FIG. 1;

FIG. 3 shows a plan view of an indexable insert in an enlarged illustration;

FIGS. 4a and b shows two sectional illustrations along section lines A-A and B-B in FIG. 3.

The tool shown in the drawing is intended as a solid drill bit for machine tools. It has an essentially cylindrical drill bit body 10 which is provided with two chip flutes 12, 14. A respective insert seat 16, 18 for accommodating an essentially quadratic indexable insert 20, 22 is provided at the front end of the chip flutes. The indexable inserts 20, 22 are each fastened to the drill bit body 10 by a countersunk head screw 26 which engages in a tapped hole 24 of the drill bit body 10.

As can be seen from FIGS. 2a to c, the inner indexable insert 22, with the inner insert corner 28 at its front-end main cutting edge 30, overlaps the drill axis 32, whereas the outer indexable insert 22, with its main cutting edge 34 in the region of the outer insert corner 36 and with its outer secondary cutting edge 38, projects beyond the circumference of the drill bit body 10. In addition, the indexable inserts, with their main and secondary cutting edges, are arranged so as to be tilted relative to the drill bit body 10 in such a way that the main cutting edges enclose a positive setting angle $\alpha_i=4°$ and $\alpha_a=2°$, respectively, relative to a plane perpendicular to the drill axis, the indices i and a identifying the inner and outer inserts, respectively. Since the secondary cutting edge 38 is oriented perpendicularly to the adjacent main cutting edge 34, the secondary cutting edge 38, in the exemplary embodiment shown, is inclined, starting from the insert corner 36, in its longitudinal extent in the direction of the drill bit body at a setting angle which corresponds to the angle $\alpha_a$. It can also be seen from FIG. 2a that the main cutting edge 34 of the outer indexable insert 22, in the direction of rotation, indicated by the arrow 40, about the drill axis 32, encloses with the main cutting edge 30 of the inner indexable insert 20 an angle which is smaller than 180° by the angle β. In the exemplary embodiment shown, the angle β is about 5°. Finally, it can be seen from FIG. 2b that the main cutting edge 30 of the inner indexable insert 20 is at a pre-cutting distance d in front of the main cutting edge 34 of the outer indexable insert 22, this distance d being 0.23 mm in the exemplary embodiment shown. The angles $\alpha_i$, $\alpha_a$ and β and the pre-cutting distance d are selected in such a way that the drill, with a defined, radial drifting force, in the region of its outer secondary cutting edge 38, bears in a sliding manner against the wall 42 of the produced hole.

As can be seen in particular from FIG. 3 in conjunction with FIG. 2b, the main cutting edges 34 of the indexable inserts 22 are subdivided in their longitudinal extent into a rectilinear working section 50 and an adjoining, rectilinear peeling section 52 extending up to the first insert corner 36, said sections 50 and 52, in the exemplary embodiment shown, enclosing an angle of 105° with one another in the region of their rounded-off transition point 54. The peeling section 52 of the main cutting edge 34 and the adjacent secondary cutting edge 38 enclose an angle of 165° with one another. Adjoining the rectilinear working section 50 of each main cutting edge 34 is a central section 58 which extends up to the second insert corner 56 and encloses with the working section a sweepback angle 60 of 165°. The central section 58 of a first main cutting edge 34 has the function of a peeling section 52 upon indexing to the next main cutting edge 34.

At the outer insert 22, the subdivision of the main cutting edge 34 into the working section 50 and the peeling section 52 has an important function, which in addition is essential to the invention. This is because it has been found that, during conventional use of a main cutting edge 34 having an insert corner rounded off toward the secondary cutting edge 38 without peeling section 52, an undesirable burr formation occurs, in particular when drilling through ductile workpieces. The burrs must be removed, for example filed off, in an additional operation. The steeply running, rectilinear peeling section 52 according to the invention, adjoining the working section 50 on the outside, ensures that stock is removed from the workpiece in a peeling manner in the diameter region while forming small chips. As a result, a burr formation is effectively avoided. The central section 58, set back at the sweepback angle, of the outer insert 22 is overlapped by the main cutting edge 30 of the leading inner insert 20 during the drilling operation and is thereby rendered ineffective. This is necessary so that the central section 58, which becomes the peeling section 52 when the insert 22 is indexed to the next main cutting edge 34, is not subjected to any wear during the drilling operation.

As shown in FIG. 3, the outer insert 22 has rotational symmetry. By turning or rotating the insert 90°, an identical and thus symmetric shape results. There are four different symmetric arrangements for the insert 22, namely the position shown in FIG. 3, and rotations of 90°, 180° and 270°, respectively.

As shown in FIG. 3, four main cutting edges are provided about the periphery of the insert 22. The main cutting edges join adjacent main cutting edges to form sweep angles, which alternate with the transition points whereat the working section and peeling section join for each of the main cutting edges disposed about the periphery of the insert 22 as shown in FIG. 3.

As shown in FIG. 3, the rectilinear working sections 50 are offset from rectilinear working sections 38 of adjacent main cutting edges by 90°. Further, the rectilinear peeling sections are offset from rectilinear peeling sections of adjacent main cutting edges by 90°. Thus, each of the four identical main cutting edges 34 are offset by 90° from adjacent main cutting edges.

It is possible in principle to also use the same inserts as inner inserts 20. In this case, dividing of chips, which is advantageous for the drilling operation, occurs in the region of the sweepback angle between working section 50 and central section 58.

In summary, the following can be emphasized: the invention relates to a solid drill bit for machine tools. The solid drill bit has a drill bit body 10 and two indexable inserts 20, 22 arranged at a radial distance from one another in a respective insert seat 16, 18 of the drill bit body 10 in the region of a chip flute 12, 14. The indexable inserts 20, 22 have an essentially quadratic contour. They project with their front-end main cutting edges 30, 34 axially beyond the drill bit body 10 and overlap one another radially in their active region. The radially outer indexable insert 22, with its outer insert corner 36 and with its adjoining secondary cutting edges 38 perpendicular to the relevant main cutting edge 34, projects radially beyond the circumference of the drill bit body. In order to permit burr-free through-drilling, the front-end main cutting edge 34 of the outer insert 22 is subdivided in its longitudinal extent into a radially inner working section 50 and a rectilinear peeling section 52 adjoining said working section 50 on the outside and extending up to the outer insert corner 36, said sections 50 and 52 enclosing a setting angle of 95° to 120°, and preferably 95° to 110°, with one another. Thus, the rectilinear working section 50 and the rectilinear peeling section 52 can enclose a setting angle of 90°+δ, wherein δ is in a range of 5° to 20°. Further, the central section 58 and the rectilinear working section 50 enclose a sweepback angle of 180°−δ, wherein δ is in the range of 5° to 20°. In the fitted state, the peeling section 52, toward the outer insert corner 36, is accordingly set at a positive setting angle of 72° to 87° relative to the end face of the drill bit body.

The invention claimed is:

1. An outer insert for a drilling tool which can be used in a machine tool, having at least one main cutting edge, extending between a first and a second insert corner, and an adjacent secondary cutting edge adjoining the first insert corner, wherein the main cutting edge is subdivided in its longitudinal extent into a rectilinear working section and an adjoining rectilinear peeling section extending up to the first insert corner, said sections enclosing an angle of 90°+δ with one another, wherein in a region of the first insert corner, the peeling section of the main cutting edge and the adjacent secondary cutting edge enclose an angle of 180°−δ with one another, wherein a central section extending up to the second insert corner adjoins the rectilinear working section of the main cutting edge, the central section enclosing a sweepback angle of 180°−δ with the working section, wherein δ is in the range of 5° to 20°, and wherein the outer insert comprises an indexable insert having third and fourth insert corners and four identical ones of said main cutting edges which are offset from adjacent ones of said main cutting edges by 90° and wherein in use a relevant said main cutting edge adjoining a relevant said corresponding insert corner performs the function of the secondary cutting edge with regard to another relevant said main cutting edge that functions as the main cutting edge.

2. The outer insert as claimed in claim 1, wherein a transition point between the working section and the peeling section of each of the main cutting edges is rounded off convexly.

3. The outer insert of claim 1, wherein the peeling section toward the outer insert corner is set at a position setting angle of 72° to 87° relative to an end face when the outer insert is secured to a drill bit body.

4. An outer indexable insert for a drilling tool comprising four identical main cutting edges with respective insert corners disposed therebetween, each said main cutting edge being subdivided in its longitudinal extent into a rectilinear working section and an adjoining rectilinear peeling section extending up to the respective insert corner, said working section and said peeling section of each said cutting edge enclosing an angle of 90°+δ with one another, and each said peeling section and the adjacent rectilinear working section of the adjacent main cutting edge enclosing an angle of 180°−δ with one another, wherein δ is in the range of 5° to 20°, and wherein in use a first said main cutting edge adjoining a said corresponding insert corner performs the function of the secondary cutting edge with regard to an adjacent said main cutting edge that functions as the main cutting edge.

5. The outer indexable insert according to claim 4, wherein a transition point between the working section and the peeling section of each said main cutting edge is rounded off convexly.

6. The outer indexable insert according to claim 5, wherein each said peeling section toward the respective said outer insert corner is set at a position setting angle of 72° to 87° relative to an end face when the outer insert is secured to a drill bit body.

7. The outer indexable insert according to claim 4, wherein the insert has rotational symmetry.

8. The outer indexable insert of claim 7, wherein the insert has rotational symmetry of the fourth order.

9. The outer indexable insert of claim 4, wherein each said rectilinear working section has the same length, and the working section of each said main cutting edge has a greater length than the adjacent peeling section thereof.

10. The outer indexable insert according to claim 4, wherein the insert comprises an essentially quadratic indexable insert.

11. The outer indexable insert according to claim 4, wherein the enclosing angle 90°+δ alternates with the enclosing angle 180°−δ about the insert.

12. The outer indexable insert according to claim 11 wherein the insert consists of four of the enclosing angles 90°+δ and four of the enclosing angles 180°−δ.

* * * * *